US012596594B2

(12) United States Patent
Qiu et al.

(10) Patent No.: US 12,596,594 B2
(45) Date of Patent: Apr. 7, 2026

(54) REINFORCEMENT LEARNING POLICY SERVING AND TRAINING FRAMEWORK IN PRODUCTION CLOUD SYSTEMS

(71) Applicants: International Business Machines Corporation, Armonk, NY (US); The Board of Trustees of the University of Illinois, Urbana, IL (US)

(72) Inventors: Haoran Qiu, Champaign, IL (US); Chen Wang, Chappaqua, NY (US); Alaa S. Youssef, Valhalla, NY (US); Hubertus Franke, Cortlandt Manor, NY (US); Ravishankar K. Iyer, Champaign, IL (US); Zbigniew Tomasz Kalbarczyk, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 18/345,827

(22) Filed: Jun. 30, 2023

(65) Prior Publication Data

US 2025/0004858 A1 Jan. 2, 2025

(51) Int. Cl.
G06F 9/50 (2006.01)
G06F 11/34 (2006.01)

(52) U.S. Cl.
CPC ........ G06F 9/5077 (2013.01); G06F 11/3442 (2013.01)

(58) Field of Classification Search
CPC .............. G06F 9/5077; G06F 11/3442; G06F 11/3006; G06N 3/006; G06N 3/08; G06N 3/092; G06N 7/01; G06N 20/00
See application file for complete search history.

(56) References Cited

U.S. PATENT DOCUMENTS

| | | | |
|---|---|---|---|
| 11,250,313 B2 | 2/2022 | Dasgupta et al. | |
| 11,468,334 B2 | 10/2022 | Chaudhury et al. | |
| 12,192,820 B2 * | 1/2025 | Yeh ........................ | G06N 3/045 |
| 2015/0178638 A1 | 6/2015 | Deshpande et al. | |
| 2017/0032279 A1 | 2/2017 | Miserendino et al. | |
| 2019/0385061 A1 | 12/2019 | Chaudhury et al. | |
| 2020/0242449 A1 | 7/2020 | Dasgupta et al. | |
| 2020/0285503 A1 * | 9/2020 | Dou ...................... | G06F 9/5072 |
| 2022/0188690 A1 * | 6/2022 | Rawat .................... | G06V 10/82 |

(Continued)

FOREIGN PATENT DOCUMENTS

| | | |
|---|---|---|
| WO | 2017201107 A1 | 11/2017 |

OTHER PUBLICATIONS

Siqiao Xue et al., "A Meta Reinforcement Learning Approach for Predictive Autoscaling in the Cloud," arXiv.org, Dated: May 31, 2022, pp. 1-10.

(Continued)

*Primary Examiner* — Dong U Kim
(74) *Attorney, Agent, or Firm* — Patterson + Sheridan, LLP

(57) ABSTRACT

Method and systems for online training management of reinforcement learning policy serving for cloud computing systems are discloses. An example method includes controlling a cloud computing system using a first reinforcement learning (RL) model; training the first RL model to generate a second RL model in response to one or more first criteria being satisfied; and controlling the cloud computing system using the second RL model in response to one or more second criteria being satisfied.

20 Claims, 5 Drawing Sheets

(56)                   References Cited

U.S. PATENT DOCUMENTS

| | | | | |
|---|---|---|---|---|
| 2022/0343117 | A1* | 10/2022 | Jeong | H04W 16/22 |
| 2022/0374704 | A1* | 11/2022 | Feng | G06F 9/5044 |
| 2022/0390909 | A1 | 12/2022 | Kubota et al. | |
| 2023/0164817 | A1* | 5/2023 | Bhamri | H04W 8/24 |
| | | | | 370/329 |
| 2023/0388856 | A1* | 11/2023 | Yan | H04W 28/24 |
| 2023/0409387 | A1* | 12/2023 | Gupta | G06F 9/44505 |
| 2023/0409393 | A1* | 12/2023 | Misra | G06F 11/3409 |
| 2024/0007414 | A1* | 1/2024 | Jain | G06F 9/505 |
| 2024/0112065 | A1* | 4/2024 | Rezaeian | G06V 10/82 |
| 2024/0355318 | A1* | 10/2024 | Beaver | G10L 15/063 |
| 2024/0422650 | A1* | 12/2024 | Hashmi | H04W 48/02 |

OTHER PUBLICATIONS

Hamid Arabnejad et al., "A Comparison of Reinforcement Learning Techniques for Fuzzy Cloud Auto-Scaling," arXiv.org, Dated: May 19, 2017, pp. 1-11.

Yisel Gari et al., "Reinforcement Learning-based Application Autoscaling in the Cloud: a Survey," arXiv.org, Dated: Nov. 17, 2020, pp. 1-40.

Jason Gauci et al., "Horizon: Facebook's Open Source Applied Reinforcement Learning Platform," arXiv.org, Dated: Sep. 4, 2019, pp. 1-10.

Shumpei Kubosawa et al., (Sep. 2021). Non-steady-state Control under Disturbances: Navigating Plant Operation via Simulation-Based Reinforcement Learning. In 2021 60th Annual Conference of the Society of Instrument and Control Engineers of Japan (SICE) (pp. 799-806). IEEE. (Abstract Only).

Peizheng Li et al., "RLOps: Development Life-cycle of Reinforcement Learning Aided Open RAN," arXiv.org, Dated: Nov. 25, 2022, pp. 1-17.

Feng Liu et al., (Jul. 2005). Neural network model for time series prediction by reinforcement learning. In Proceedings. 2005 IEEE International Joint Conference on Neural Networks, 2005. (vol. 2, pp. 809-814). IEEE.

Jose Antonio Martin H., "Reinforcement Learning in System Identification," arXiv.org, Dated: Dec. 14, 2022, pp. 1-21.

Marcel Panzer & Benedict Bender (2022) Deep reinforcement learning in production systems: a systematic literature review, International Journal of Production Research, 60:13, 4316-4341, DOI: 10.1080/00207543.2021.1973138.

Lucia Schuler et al., "AI-based Resource Allocation: Reinforcement Learning for Adaptive Auto-scaling in Serverless Environments," arXiv.org, Dated: May 29, 2020, pp. 1-8.

Spathis, Dimitrios. Machine learning to model health with multimodal mobile sensor data. Diss. University of Cambridge, Year: 2022, pp. 1-172.

Zhengjie Sun et al., "Cloud-Edge Collaboration in Industrial Internet of Things: a Joint Offloading Scheme Based on Resource Prediction," IEEE Internet of Things Journal, 9(18), Year: 2021, pp. 17014-17025 (Abstract Only).

Wei, Yi, et al. "A reinforcement learning based auto-scaling approach for SaaS providers in dynamic cloud environment." Mathematical Problems in Engineering 2019, Year: 2019, pp. 1-2.

* cited by examiner

400

402

Control a cloud computing system using a
first reinforcement learning (RL) model

404

Train the first RL model to generate a second RL model in
response to one or more first criteria being satisfied

406

Control the cloud computing system using the second RL model
in response to one or more second criteria being satisfied

REINFORCEMENT LEARNING POLICY SERVING AND TRAINING FRAMEWORK IN PRODUCTION CLOUD SYSTEMS

BACKGROUND

The present invention relates to cloud computing systems, and more specifically, to automated resource management of cloud computing systems.

Cloud computing may provide on-demand access, via the internet, to computing resources-applications, servers (physical servers and virtual servers), data storage, development tools, networking capabilities, and more. In some cases, cloud computing may be hosted at a remote data center managed by a cloud services provider. Cloud computing environments may apply resource management in order to effectively control how resources (e.g., processing, memory, storage, bandwidth, latency, etc.) are distributed among users, applications, and/or services. For example, a cloud computing environment may monitor the processing load of certain services and adjust the amount of memory and processing resources that the services can use over time. The resource management of cloud computing may enable efficient use of resources, which can lead to cost savings, reduced energy consumption, reduced congestion, etc.

SUMMARY

Some aspects provide a method. The method includes controlling a cloud computing system using a first reinforcement learning (RL) model. The method further includes training the first RL model to generate a second RL model in response to one or more first criteria being satisfied. The method further includes controlling the cloud computing system using the second RL model in response to one or more second criteria being satisfied.

Some aspects provide a system. The system includes a memory. The system includes one or more processors coupled to the memory, the one or more processors being configured to control a cloud computing system using a first reinforcement learning (RL) model, train the first RL model to generate a second RL model in response to one or more first criteria being satisfied, and control the cloud computing system using the second RL model in response to one or more second criteria being satisfied.

Some aspects provide a computer program product for online training management. The computer program product comprises a computer-readable storage medium having computer-readable program code embodied therewith. The computer-readable program code is executable by one or more computer processors to control a cloud computing system using a first reinforcement learning (RL) model, train the first RL model to generate a second RL model in response to one or more first criteria being satisfied, and control the cloud computing system using the second RL model in response to one or more second criteria being satisfied.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
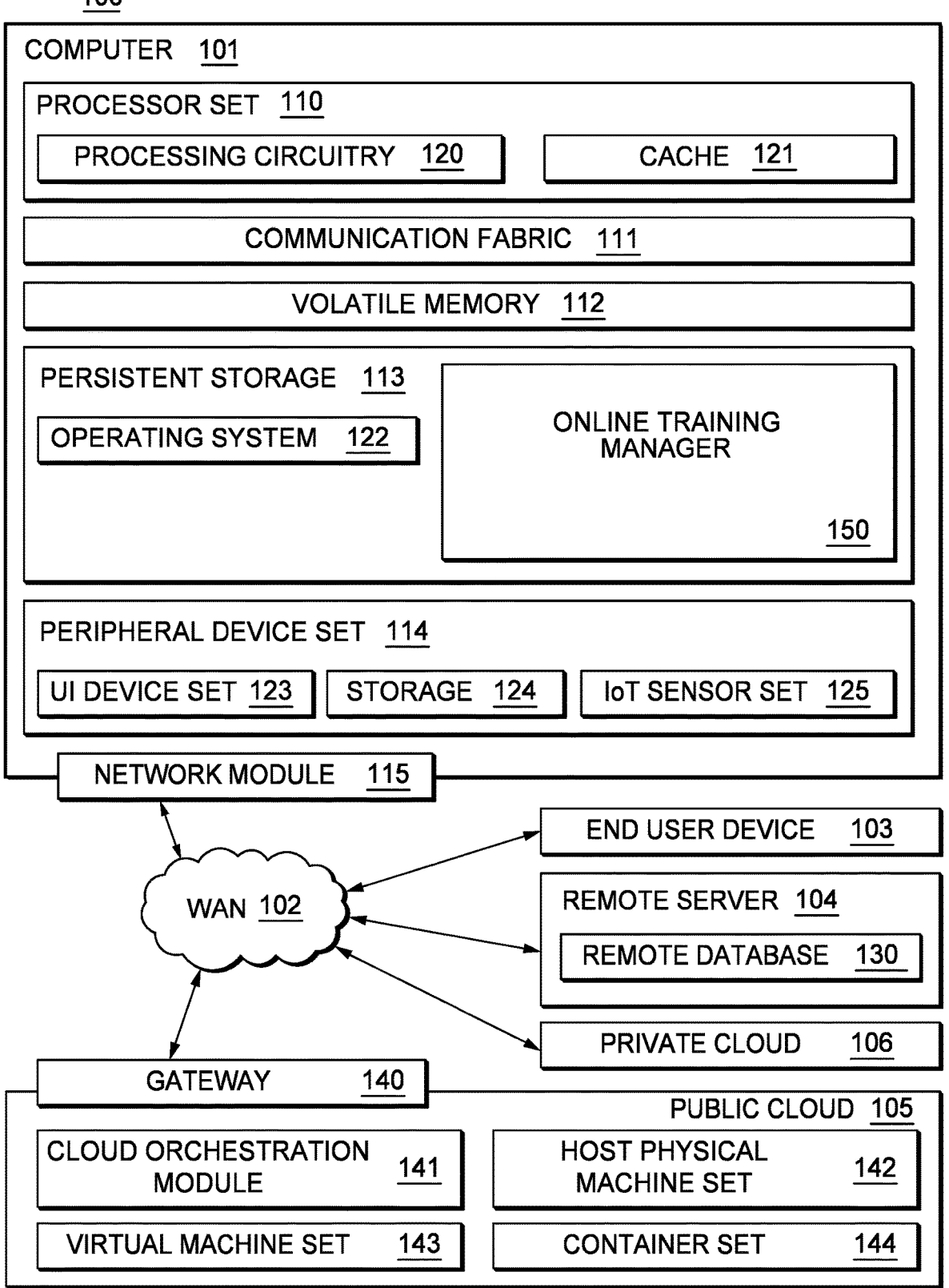
FIG. 1 depicts an example computing environment for the execution of at least some of the computer code involved in performing the inventive methods.

Embodiments of the present disclosure provide techniques for automated management of cloud computing systems, for example, via reinforcement learning (RL).

Cloud computing systems may include a cluster of servers interconnected via network links. On a distributed system, applications for end-users may be deployed to run on one or more servers in the cloud computing system. In certain cases, machine learning may be used to control various aspects of a cloud computing system. For example, RL may be used to control resource management, autoscaling, congestion control, load balancing, etc. associated with a cloud computing system. An RL agent developed for managing various cloud computing systems tasks may ensure the cloud computing system and/or the application(s) are in a suitable state, for example, as specified by certain performance specifications in a service-level agreement (SLA) between a cloud computing service provider and an application service provider. RL applies policy training, which determines an optimal policy that works for the application workloads and the environment, and policy serving, which applies the learned policy without updating the RL model. The performance of the RL model or policy that has been trained may depend on the application workloads and the system environment. Whenever there is a significant change to the application and/or the underlying platform or infrastructure, the performance of the RL model may degrade. For example, when an application is updated to a new version, the application may use different resources (e.g., more memory or networking resources), and thus, RL-based resource management may degrade the performance of the updated application. In some cases, the RL model may be retrained and continue to be used for online resource scaling. In addition, when there is continuous online training performed for the RL mode, updating the RL model may lead to increased energy consumption, computing power, and/or resource utilization.

Aspects of the present disclosure provide techniques and systems for automated resource management of cloud computing systems. As an example, a cloud computing system may use an RL model for resource management, such as RL-based autoscaling for a container orchestration system (e.g., Kubernetes®). The cloud computing system may detect when to trigger RL model retraining and determine when to stop online training of the RL model. Such a scheme for online RL model training and RL model serving (e.g., switching between RL model serving (without online training) and retraining (online training)) may enable reliable performance of the RL model and reduce the time that online training of the RL model is performed. The cloud computing system may monitor various criteria associated with the cloud computing system as further described herein to detect when to perform the online training and when to stop the online training. The automated resource management of the cloud computing systems may be performed continuously, for example, to detect whenever there is an update in the RL environment, such as a change in the application workload, or a change to the cloud computing system infrastructure.

The systems and methods for automated resource management of cloud computing systems described herein may provide various advantages. For example, automated resource manage may improve the performance of cloud computing systems, including for example, improved computing performance, improved energy consumption, and/or efficient resource utilization. The improved performance may be attributable to the automated online training of an RL model as described herein. Such online training may allow the RL model to adapt to changes in the cloud computing environment, such as changes in software and/or hardware.

FIG. 1 depicts an example computing environment 100. Computing environment 100 contains an example of an environment for the execution of at least some of the computer code involved in performing the inventive methods, such as an online training manager 150 that detects when to perform online training of an RL model and when to stop the training, as further described herein. In addition to the online training manager 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the online training manager 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. In certain aspects, any of the components in the computing environment 100 may include the online training manager 150. For example, the public cloud 105 and/or the private cloud 106 may include the online training manager 150 to facilitate the automated training for cloud management as further described herein.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the online training manager 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the online training manager 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
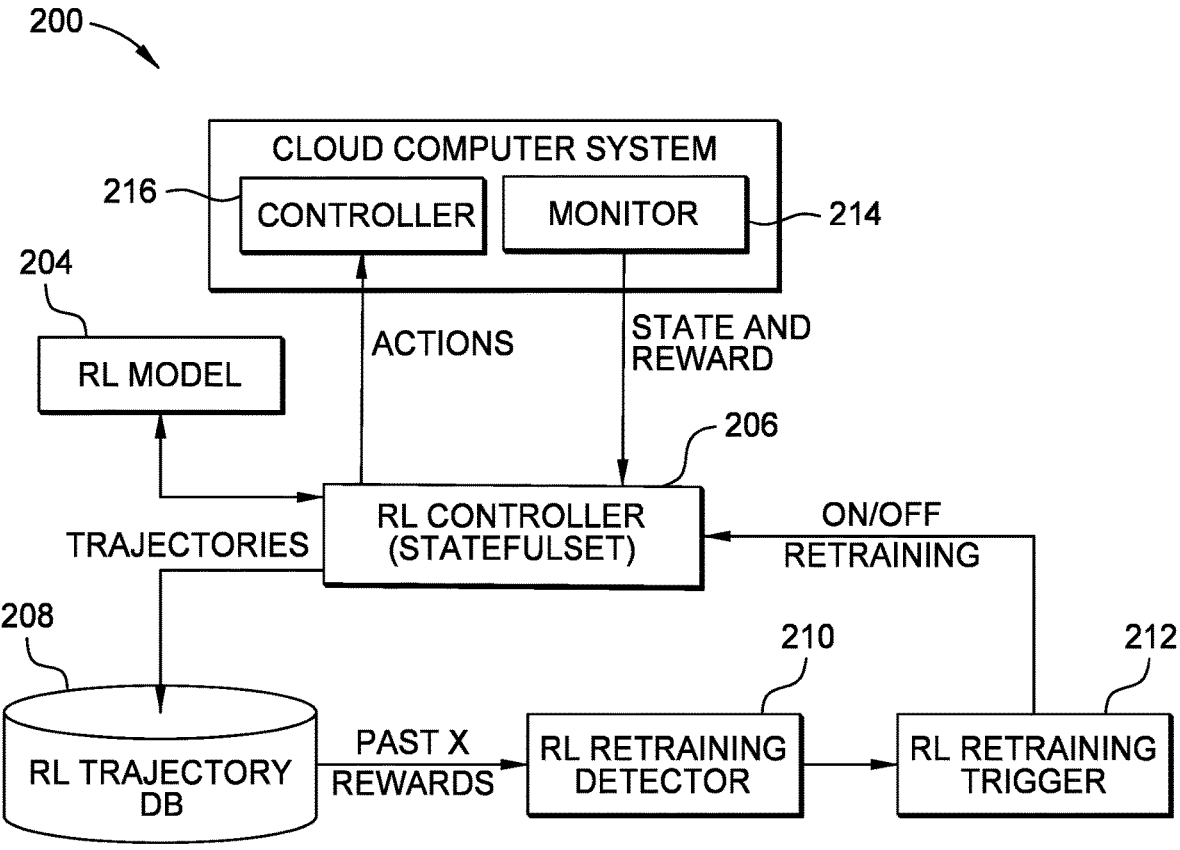
FIG. 2 is a diagram illustrating an example a computing environment where a cloud computing system is controlled via a reinforcement learning (RL) model.

FIG. 2 is a diagram illustrating an example a computing environment 200 where a cloud computing system 202 (e.g., the public cloud 105 and/or the private cloud 106) is controlled via an RL model 204. The RL-based control of the cloud computing system 202 may be implemented for any of various cloud management functionalities, including for example, resource autoscaling, power management, load balancing, congestion control, database query optimization, etc. In this example, the description of the RL-based control is focused on vertical and/or horizontal autoscalers for a container orchestration system, such as Kubernetes, which is a distributed container orchestration platform used to manage container-based workloads of the cloud computing system 202. In Kubernetes, vertical and horizontal autoscalers may have a recommender to get online measurements from the metrics server and apply the scaling recommendation to the application deployment. The RL model 204 may effectively serve as the recommender of the autoscalers for Kubernetes.

As shown, the computing environment 200 may include a cloud computing system 202, the RL model 204, an RL controller 206, an RL trajectory database (DB) 208, an RL retraining detector 210, and an RL retraining trigger 212. In certain aspects, the RL model 204, the RL controller 206, the RL trajectory database DB 208, the RL retraining detector 210, and/or the RL retraining trigger 212 may be implemented as software components (e.g., computer-readable instructions) that are executed on one or more processors of a computing device (e.g., the computer 101, the public cloud 105, and/or the private cloud 106) to cause the computing device to perform any aspect of the operations for automated control of the cloud computing system as described herein. For example, the online training manager 150 as depicted in FIG. 1 may include the RL model 204, the RL controller 206, the RL trajectory database DB 208, the RL retraining detector 210, and/or the RL retraining trigger 212. For certain aspects, the RL trajectory database DB 208 may be implemented as local and/or remote storage, including, for example, the cache 121, the volatile memory 112, the persistent storage 113, the storage 124, and/or the remote database 130.

The RL model 204 may be or include an intelligent agent, such an RL agent. When operating in the policy serving stage, the RL model 204 may be representative of a machine learning model trained in a particular state (e.g., a first RL model). An RL agent may be an instantiation of an RL algorithm including, for example, a policy gradient algorithm (e.g., REINFORCE), value-based algorithm (e.g., Q-learning), and/or actor-critic algorithm (e.g., a deep deterministic policy gradient (DDPG) and/or proximal policy optimization (PPO)). When operating in the online training stage, the RL model 204 may be representative of a subsequently trained machine learning model, for example, incrementally (or iteratively) trained via interactions with the cloud computing system 202 (e.g., a second RL model). In certain aspects, the updated or retrained RL model 204 (e.g., the second RL model) may apply the same model architecture as the base RL model (e.g., the first RL model) with updated model parameters.

The RL controller 206 may provide a communication interface between the RL model 204 and the cloud computing system 202. The RL controller 206 may be in communication with the cloud computing system 202, the RL model 204, the RL trajectory DB 208, and/or the RL retraining trigger 212. The RL controller 206 may effectively wrap around the RL model 204 in terms of communications (e.g., a remote procedure call (RPC)) between the RL model 204 and the cloud computing system 202. As an example, the RL controller 206 may facilitate the integration of the RL model 204 with a multi-dimensional autoscaling recommender (e.g., horizontal and/or vertical scaling) and/or a metric server associated with a Kubernetes system. The RL controller 206 may convert metric information from a cloud monitor 214 of the cloud computing system into state and reward information for the RL model 204. The RL controller 206 may convert action(s) output by the RL model 204 into recommendation information (e.g., vertical and horizontal scaling actions, adding or removing a replica, increasing or decreasing a CPU limit, etc.) for a cloud controller 216 (e.g., a recommender) of the cloud computing system. The RL controller 206 may connect the RL model 204 with the Kubernetes autoscaling environment to enable policy serving and online training of the RL model 204. The RL model 204 may use the cloud computing system for policy training and/or policy serving, as further described herein.

The RL trajectory DB 208 may be or include a time-indexed database that stores the RL trajectories associated with the RL model 204. In certain aspects, the RL controller 206 may provide the trajectories to the RL trajectory DB 208. A trajectory may correspond to certain input provided to the RL model 204 and the output generated by the RL model 204 using the respective input. A trajectory may also be called an episode in terms of RL. Since RL formulates the control problem as a Markov decision-making problem, at each time step, the RL agent may obtain the state, perform an action, and obtains a reward. The sequence of such state-action-reward combinations in an episode may be called a trajectory. For example, a trajectory may correspond to the state and reward provided as input and the action generated as output. The RL trajectory DB 208 may store a timestamp associated with each of the trajectories, where the timestamp may correspond to when the input is received and/or when the output is generated. The RL trajectory DB 208 may collect the trajectories from the RL controller 206 without blocking or disrupting the control loop operations of the RL controller 206. The RL trajectory DB 208 may provide an RL performance profile to detect when to start and/or stop online training (as further described herein) of the RL model 204 and/or to provide a history of trajectories for online training of the RL model 204.

The RL retraining detector 210 may monitor the trajectories via the RL trajectory DB 208 to determine when to start and/or stop online training of the RL model 204. The RL retraining detector 210 may trigger the RL retraining to avoid performance degradation and stop RL retraining to avoid additional training costs. The RL retraining detector 210 may be in communication with the RL trajectory DB 208 and the RL retraining trigger 212. For certain aspects, the RL retraining detector 210 may periodically check the trajectories. In certain aspects, the RL retraining detector 210 may check the trajectories in response to a particular event (e.g., a change in the cloud computing environment). In some cases, the RL retraining detector 210 may be implemented as a cron job, for example, an automated task that is repeatedly performed at specific time(s). When the RL model 204 is in the policy serving stage, the RL retraining detector 210 may monitor the trajectories to determine when to start the online training. In response to detecting to start the online training, the RL retraining detector 210 may provide, to the RL retraining trigger 212, an indication to start the online training. When the RL model 204 is in the policy training stage (e.g., online training), the RL retraining detector 210 may monitor the trajectories to determine when to stop the online training. In response to detecting to stop the online training, the RL retraining detector 210 may provide, to the RL retraining trigger 212, an indication to stop the online training.

The RL retraining trigger 212 may provide, to the RL controller 206, an indication to start or stop the online training of the RL model. The RL retraining trigger 212 may send a message to the RL controller 206 to intercept the RL control flow. For example, the RL retraining trigger 212 may update a particular control variable (e.g., a Boolean variable) in a configuration for the RL controller 206. The control variable may be in a shared configuration database, file, and/or memory location, for example. If the variable is set to true, the model update may be included in the RL loop (e.g., for-loop) of stepping functions (e.g., the RL model is in the policy training phase); otherwise (e.g., the variable is set to false), the model update may be excluded in the RL loop (e.g., the RL model is in the policy serving phase without online training).

Figure 3:
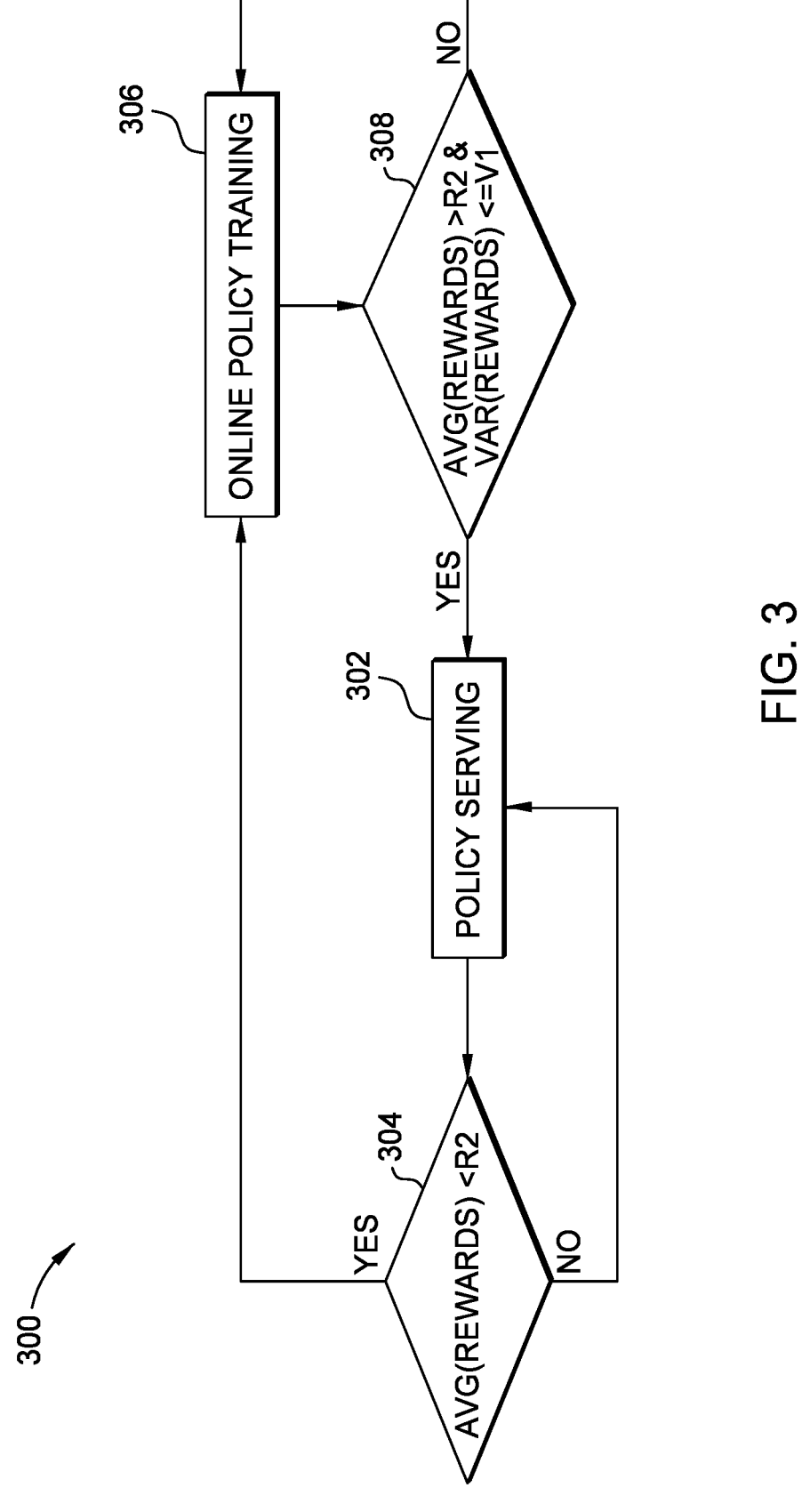
FIG. 3 is a diagram illustrating example operations for switching between serving an RL model and performing online training of the RL model.

FIG. 3 is a diagram illustrating example operations 300 for switching between serving an RL model and performing online training of the RL model. The operations 300 may be performed, for example, by a computing device (e.g., the computer 101, the public could 105, and/or the private cloud 106).

The operations 300 may optionally begin, at block 302, where the computing device may control a cloud computing system (e.g., the cloud computing system 202) via an RL model (e.g., the RL model 204) in a policy serving phase (e.g., without online training). Prior to being deployed in the policy serving phase, the RL model may be trained offline, for example, via a simulated computing environment. In some cases, as an initial step of model deployment, the RL model may undergo online training in the production computing environment.

At block 304, the computing device may monitor the trajectories associated with the RL model (for example, via the RL trajectory DB 208) and determine if the trajectories indicate to start online training of the RL model. As an example, to detect when to start retraining, the computing device may determine the average reward value for the past X episodes (or trajectories) and compare the average reward value with a reward threshold (R2). The reward threshold may be determined based on target application/systems performance and utilization objectives. For example, a target reward may be based on a target quality of service (QOS) and a target utilization. The target reward may be representative of the reward threshold (R2). The target reward may be determined as a product of the QoS and the resource utilization (e.g., reward threshold=performance_QoS*utilization, where performance_QoS and utilization are between [0, 1]). As an example, there may be a goal of achieving performance QoS of Y=80% and resource utilization of Z=70%, such that the target reward is equal to 0.8*0.7-0.56. If the average reward is less than the reward threshold of 0.56 (e.g., R2=0.56), the computing device may determine to start online training of the RL model. In this example, X, Y, and/or Z may be configurable parameter(s) and/or predetermined. If the average reward is greater than or equal to the reward threshold, the computing device may continue to control the cloud computing system via the RL model in the policy serving phase at block 302. The computing device may periodically check whether to start online training at block 304, for example, every 5 minutes, 15 minutes, 30 minutes, etc.

At block 306, in response to determining to start online training, the computing device may perform online training of the RL model. The computing device may train RL agent(s) online in the computing environment. As an example, the RL agent may collect information about the cloud computing system by interacting with the cloud computing system, for example, providing recommended actions for the cloud computing system (such as vertical and/or horizontal scaling instructions) based on state and reward information associated with the cloud computing system. The RL agent may use the experience (e.g., past trajectories) obtained from interacting with the cloud computing system to further train the RL model (e.g., by model parameter training).

At block 308, the computing device may monitor the trajectories associated with the updated RL model and determine if the trajectories indicate to stop online training of the RL model. For example, to detect when to stop online training of the RL model, the computing device may determine the average reward value for the past X episodes (and/or trajectories) and/or the variance of the past X reward values. The computing device may compare the variance of the X rewards values with a variance threshold V1 and/or the average reward value with a reward threshold (R2), as described herein with respect to block 304. If the variance is less than or equal to the variance threshold V1, and if the average reward value is greater than or equal to the reward threshold (R2), the RL model may be considered to be converged and retraining may be stopped. The computing device may proceed to controlling the cloud computing system with the updated RL model at block 302. If the variance is greater than the variance threshold V1, and if the average reward value is less than the reward threshold (R2), the RL model may not be considered to be converged, and online training of the RL model may continue at block 306. In certain aspects, model convergence (e.g., when to stop training) may be assumed to occur when the moving average of the reward signal varies in a range specified by a threshold relative to the value of the moving average of the reward. For certain aspects, the computing device may prevent or alert of the online training causing the RL model to converge to a relatively reward value, for example, due to the RL model not being suitable for the updated environment. As an example, if the retraining takes more than O episodes, the RL retraining detector may trigger a stop to the online training and/or output an alert to inspect the RL model. In this example, X, T, and O may be configurable parameter(s) and/or predetermined. The computing device may periodically check whether to stop online training at block 308, for example, every 5 minutes, 15 minutes, 30 minutes, etc.

While the example depicted in FIG. 3 is described herein with respect to certain criteria to trigger starting and/or stopping online training of an RF model to facilitate understanding, aspects of the present disclosure may also be applied to other suitable criteria to determine when to start and/or stop the online training.

Figure 4:
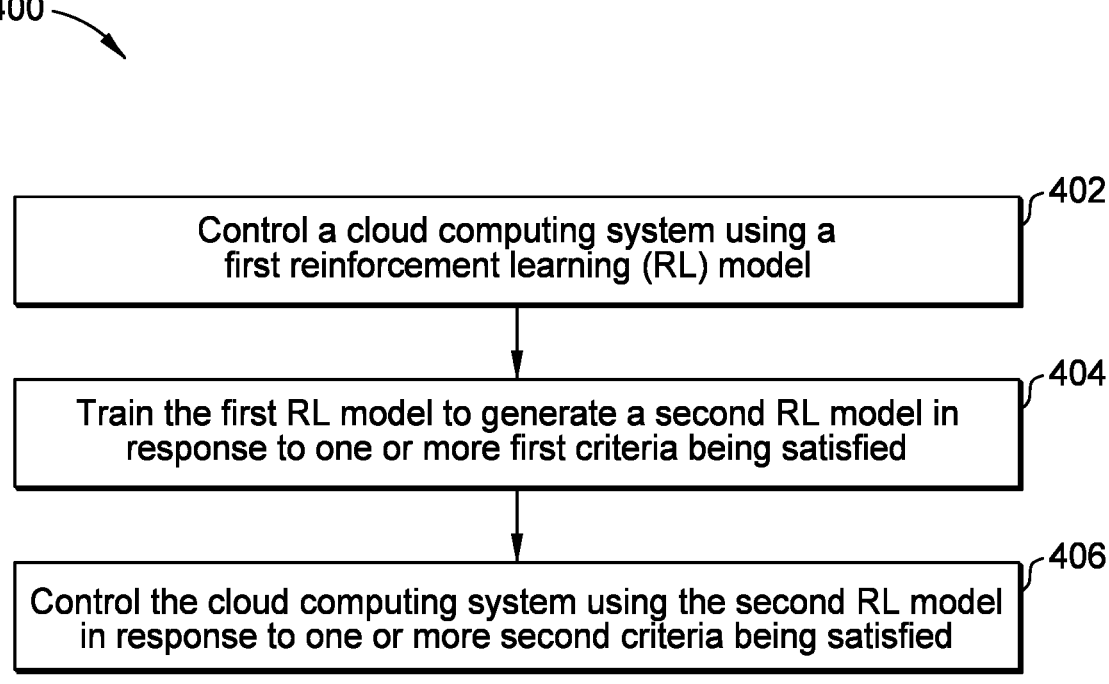
FIG. 4 is a flow diagram illustrating example operations for controlling a cloud computing system.

FIG. 4 is a flow diagram illustrating example operations 400 for controlling a cloud computing system. The operations 400 may be performed, for example, by a computing device (e.g., the computer 101, the public could 105, and/or the private cloud 106). In certain aspects, the computing device may include a cluster management system, which may be used to serve application workloads, for a cloud computing system.

The operations 400 may optionally begin, at block 402, where the computing device may control a cloud computing system (e.g., the public cloud 105 and/or the private cloud 106) using a first RL model. To control the cloud computing system, the computing device may adjust various computing and/or networking resources including, for example, processing resources (e.g., general purpose processing cores, application specific processing cores, latency-sensitive processing, etc.), storage resources (e.g., frequently accessed storage, archival storage, durable storage, etc.), and/or network resources (e.g., bandwidth and/or latency). As an example, to control the cloud computing system, the computing device may control resource autoscaling associated with the cloud computing system, power management associated with the cloud computing system, load balancing associated with the cloud computing system, congestion control associated with the cloud computing system, database query performance associated with the cloud computing system, or a combination thereof. In certain aspects, to control the cloud computing system using the first RL model, the computing device may serve the first RL model while refraining from performing online training of the first RL model, for example, as described herein with respect to block 302 of FIG. 3. For example, the computing device may control the cloud computing system (e.g., the cloud computing system 202) via an RL model (e.g., the RL model 204) in a policy serving phase (e.g., without online training).

At block 404, the computing device may train the first RL model to generate a second RL model in response to one or more first criteria being satisfied. To train the first RL model, the computing device may perform online training of the first RL model, for example, as described herein with respect to block 306 of FIG. 3.

At block 406, the computing device may control the cloud computing system using the second RL model in response to one or more second criteria being satisfied. To control the cloud computing system using the second RL model, the computing device may serve the second RL model while refraining from performing online training of the second RL model, for example, as described herein with respect to block 302 of FIG. 3. In certain aspects, the second RL model may include a retrained version of the first RL model and any subsequently trained versions thereof, for example, through one more iterations of online training at block 404. The second RL model may include a subsequently trained version of the first RL model, for example, incrementally (or iteratively) trained via interactions with the cloud computing system at block 404. In certain aspects, the second RL model may apply the same model architecture as the first RL model, but with updated model parameters.

In certain aspects, the computing device may monitor the status of the RL model to determine when to start online training (e.g., at block 404) and/or when to stop online training (e.g., at block 406). To detect when to start the online training, the computing device may monitor one or more first properties (e.g., a reward) associated with one or more first trajectories generated while using the first RL model, for example, as described herein with respect to block 304. The computing device may determine that the one more first criteria are satisfied based at least in part on the one or more first properties. The one or more first criteria may be satisfied in response to a first metric associated with the one or more first properties (e.g., an average reward) being less than a first threshold. The first metric may include an average reward value among a certain number of past trajectories (e.g., the past 10 trajectories) in a sequence and/or among past trajectories in a certain time window (e.g., the trajectories in the past 10 minutes). The first metric may be determined from past trajectories generated when the first RL model is being used in the policy serving stage (for example, at block 302).

To detect when to stop the online training, the computing device may monitor one or more second properties (e.g., a reward) associated with one or more second trajectories generated while training the first RL model, for example, as described herein with respect to block 308. The computing device may determine that the one or more second criteria are satisfied based at least in part on the one or more second properties. The one or more second criteria may be satisfied in response to a second metric associated with the one or more second properties (e.g., a variance of rewards) being less than or equal to a second threshold, and/or a third metric associated with the one or more second properties (e.g., the average reward) being greater than or equal to a third threshold. The second metric may include a variance of reward values among a number of past trajectories generated using the first RL model during the training (for example, at block 306, 404). The third metric may include an average reward value among a number of past trajectories generated using the first RL model during the training (for example, at block 306, 404).

In certain aspects, the computing device may store the trajectories to train the RL model and/or to detect when to perform the online training. The computing device may store the one or more first trajectories and the one or more second trajectories in a database (e.g., the RL trajectory DB 208). To monitor the one or more first properties and/or the one or more second properties, the computing device may monitor the one or more first properties and/or the one or more second properties via the database (e.g., stored in the RL trajectory DB 208).

For certain aspects, the computing device may output indications to trigger when to start and/or stop the online training of the RL model. The computing device may output a first indication to start training the first RL model in response to the one or more first criteria being satisfied, for example, as described herein with respect to the RL retraining trigger 212. The computing device may output a second indication to stop training the first RL model in response to the one or more second criteria being satisfied, for example, as described herein with respect to the RL retraining trigger 212.

Figure 5:
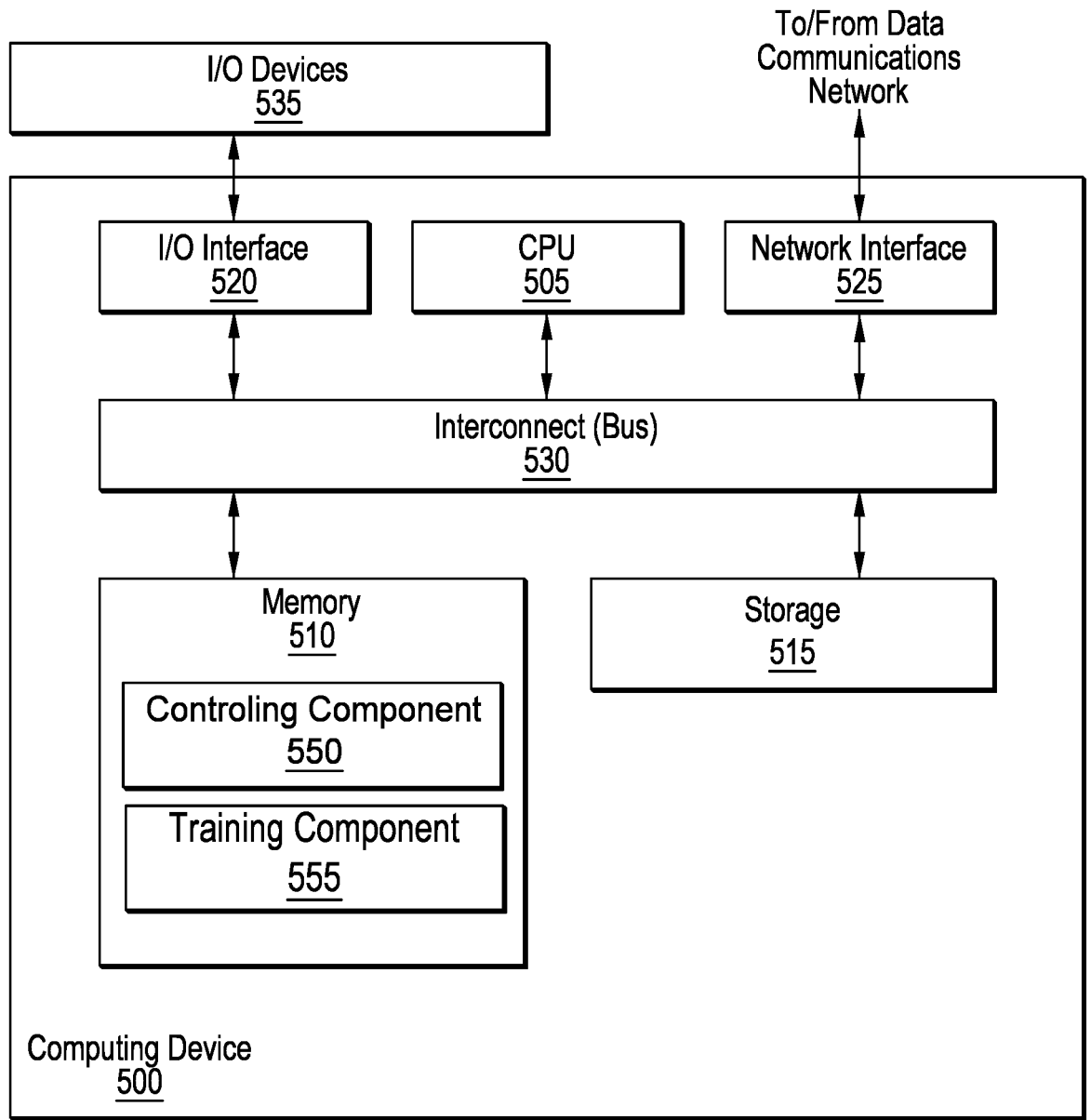
FIG. 5 depicts an example computing device configured to perform various aspects of the present disclosure.

FIG. 5 depicts an example computing device configured to perform various aspects of the present disclosure, according to one embodiment. Although depicted as a physical device, in embodiments, the computing device 500 may be implemented using virtual device(s), and/or across a number of devices (e.g., in a cloud environment). In one embodiment, the computing device 500 corresponds to an online training management system, such as discussed above with reference to FIGS. 1-4.

As illustrated, the computing device 500 includes a CPU 505, memory 510, storage 515, a network interface 525, and one or more I/O interfaces 520. In the illustrated embodiment, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally included to be representative of a random-access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 535 (such as keyboards, monitors, etc.) are connected via the I/O interface(s) 520. Further, via the network interface 525, the computing device 500 can be communicatively coupled with one or more other devices and components (e.g., via a network, which may include the Internet, local network(s), and the like). For example, the network interface 525 may correspond to a wireless communications radio (e.g., a WiFi radio) that the computing device 500 uses to provide a wireless network (e.g., a WLAN) for client devices. As illustrated, the CPU 505, memory 510, storage 515, network interface(s) 525, and I/O interface(s) 520 are communicatively coupled by one or more buses 530. In the illustrated embodiment, the memory 510 includes a controlling component 550 and/or a training component 555, which may perform one or more embodiments discussed above. Although depicted as discrete components for conceptual clarity, in embodiments, the operations of the depicted components (and others not illustrated) may be combined or distributed across any number of components. Further, although depicted as software residing in memory 510, in embodiments, the operations of the depicted components (and others not illustrated) may be implemented using hardware (e.g., circuitry), software (e.g., computer-readable instructions), or a combination of hardware and software.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method, comprising:

controlling resources of a cloud computing system using a first reinforcement learning (RL) model, the first RL model performs tasks to automate control of the resources while refraining from performing online training of the first RL model, wherein the first RL model, for each of the tasks, receives state information from the cloud computing system, returns an action to the cloud computing system, receives reward information from the cloud computing system, and records a first trajectory comprising the state, action, and reward for each of the tasks;

monitoring at least one first trajectory generated while using the first RL model to identify a first trigger to start online training of the first RL model;

performing online training of the first RL model to generate a second RL model in response to the first trigger;

monitoring one or more second trajectories generated while performing the online training of the first RL model, to identify a second trigger to stop the online training of the first RL model; and controlling the resources of the cloud computing system using the second RL model in response to the second trigger while refraining from performing online training of the second RL model.

2. The method of claim 1, wherein monitoring the at least one first trajectory further comprises evaluating, based on the at least one first trajectory, one or more first properties of the reward information received from the cloud computing system for each of the tasks, the one or more first properties of the reward information comprises one or more performance metrics or utilization metrics associated with the action for each task; and wherein monitoring the one or more second trajectories further comprises evaluating, based on the one or more second trajectories, one or more second properties of the reward information received from the cloud computing system for each of the tasks, the one or more second properties of the reward information comprises one or more performance metrics or utilization metrics associated with the action for each task.

3. The method of claim 2, wherein the first trigger to start online training of the first RL model is identified based on the one or more performance metrics or utilization metrics of the one or more first properties of the reward information being less than a first threshold; and wherein the second trigger to stop online training of the first RL model is identified based on the one or more performance metrics or utilization metrics of the one or more second properties of the reward information being less than or equal to a second threshold or being greater than or equal to a third threshold.

4. The method of claim 3, wherein:

the one or more performance metrics or utilization metrics of the one or more first properties of the reward information include an average reward value among a number of past trajectories generated using the first RL model and wherein the one or more performance metrics or utilization metrics of the one or more second properties of the reward information include a variance of reward values among a number of past trajectories generated using the first RL model during the online training or an average reward value among the number of past trajectories generated using the first RL model during the online training.

5. The method of claim 2, further comprising:

storing the at least one first trajectory and the one or more second trajectories in a database;

wherein evaluating the one or more first properties comprises evaluating the one or more first properties via the database; and wherein evaluating the one or more second properties comprises evaluating the one or more second properties via the database.

6. The method of claim 1, further comprising:

outputting a first indication to start the online training the first RL model in response to the first trigger; and outputting a second indication to stop the online training the first RL model in response to the second trigger.

7. The method of claim 1, wherein controlling resources of the cloud computing system comprises:

controlling resource autoscaling associated with the resources of the cloud computing system;

controlling power management associated with the resources of the cloud computing system;

controlling load balancing associated with the resources of the cloud computing system;

controlling congestion control associated with the resources of the cloud computing system;

controlling database query performance associated with the resources of the cloud computing system; or a combination thereof.

8. The method of claim 1, wherein performing the online training of the first RL model comprises performing online training of the first RL model while using the first RL model to perform the tasks to automate control of the resources.

9. A system, comprising:

a memory; and one or more processors coupled to the memory, the one or more processors being configured to:

control resources of a cloud computing system using a first reinforcement learning (RL) model, the first RL model performs tasks to automate control of the resources while refraining from performing online training of the first RL model, wherein the first RL model, for each of the tasks, receives state information from the cloud computing system, returns an action to the cloud computing system, receives reward information from the cloud computing system, and records a first trajectory comprising the state, action, and reward for each of the tasks;

monitor at least one first trajectory generated while using the first RL model, to identify a first trigger to start online training of the first RL model;

perform online training of the first RL model to generate a second RL model in response to the first trigger;

monitor one or more second trajectories generated while performing the online training of the first RL model, to identify a second trigger to stop the online training of the first RL model; and control the resources of the cloud computing system using the second RL model in response to the second trigger, while refraining from performing online training of the second RL model.

10. The system of claim 9, wherein the one or more processors are further configured to:

evaluate, based on the at least one first trajectory, one or more first properties of the reward information received from the cloud computing system for each of the tasks, the one or more first properties of the reward information comprises one or more performance metrics or utilization metrics associated with the action for each task; and evaluate, based on the one or more second trajectories, one or more second properties of the reward information received from the cloud computing system for each of the tasks, the one or more second properties of the reward information comprises one or more performance metrics or utilization metrics associated with the action for each task.

11. The system of claim 10, wherein the first trigger to start online training of the first RL model is identified based on the one or more performance metrics or utilization metrics of the one or more first properties of the reward information being less than a first threshold; and
wherein the second trigger to stop online training of the first RL model is identified based on the one or more performance metrics or utilization metrics of the one or more second properties of the reward information being less than or equal to a second threshold, or being greater than or equal to a third threshold.

12. The system of claim 11, wherein:
the one or more performance metrics or utilization metrics of the one or more first properties of the reward information include an average reward value among a number of past trajectories generated using the first RL model; wherein the one or more performance metrics or utilization metrics of the one or more second properties of the reward information include a variance of reward values among a number of past trajectories generated using the first RL model during the online training; or an average reward value among the number of past trajectories generated using the first RL model during the online training.

13. The system of claim 10, wherein:
the one or more processors are further configured to store the at least one first trajectory and the one or more second trajectories in a database;
the one or more processors are further configured to evaluate the one or more first properties via the database; and
the one or more processors are further configured to evaluate the one or more second properties via the database.

14. The system of claim 9, wherein the one or more processors are further configured to:
output a first indication to start the online training the first RL model in response to the first trigger; and
output a second indication to stop the online training the first RL model in response to the second trigger.

15. The system of claim 9, wherein to control resources of the cloud computing system, the one or more processors are further configured to:
control resource autoscaling associated with the resources of the cloud computing system;
control power management associated with the resources of the cloud computing system;
control load balancing associated with the resources of the cloud computing system;
control congestion control associated with the resources of the cloud computing system;
control database query performance associated with the resources of the cloud computing system; or
a combination thereof.

16. The system of claim 9, wherein to perform online training of the first RL model, the one or more processors are further configured to perform the online training of the first RL model while using the first RL model to perform the tasks to automate control of the resources.

17. A computer program product for online training management, the computer program product comprising:
a computer-readable storage medium having computer-readable program code embodied therewith, the computer-readable program code executable by one or more computer processors to:

control resources of a cloud computing system using a first reinforcement learning (RL) model, the first RL model performs tasks to automate control of the resources while refraining from performing online training of the first RL model, wherein the first RL model, for each of the tasks, receives state information from the cloud computing system, returns an action to the cloud computing system, receives reward information from the cloud computing system, and records a first trajectory comprising the state, action, and reward for each of the tasks;
monitor at least one first trajectory generated while using the first RL model, to identify a first trigger to start online training of the first RL model;
perform online training of the first RL model to generate a second RL model in response to the first trigger;
monitor one or more second trajectories generated while performing the online training of the first RL model, to identify a second trigger to stop the online training of the first RL model; and
control the resources of the cloud computing system using the second RL model in response to the second trigger, while refraining from performing online training of the second RL model.

18. The computer program product of claim 17, wherein the computer-readable program code being further executable by the one or more computer processors to:
evaluate, based on the at least one first trajectory, one or more first properties of the reward information received from the cloud computing system for each of the tasks, the one or more first properties of the reward information comprises one or more performance metrics or utilization metrics associated with the action for each task; and
evaluate, based on the one or more second trajectories, one or more second properties of the reward information received from the cloud computing system for each of the tasks, the one or more second properties of the reward information comprises one or more performance metrics or utilization metrics associated with the action for each task.

19. The computer program product of claim 18, wherein the first trigger to start online training of the first RL model is identified based on the one or more performance metrics or utilization metrics of the one or more first properties of the reward information being less than a first threshold; and
wherein the second trigger to stop online training of the first RL model is identified based on the one or more performance metrics or utilization metrics of the one or more second properties of the reward information being less than or equal to a second threshold, or being greater than or equal to a third threshold.

20. The computer program product of claim 19, wherein:
the one or more performance metrics or utilization metrics of the one or more first properties of the reward information include an average reward value among a number of past trajectories generated using the first RL model; wherein the one or more performance metrics or utilization metrics of the one or more second properties of the reward information include a variance of reward values among a number of past trajectories generated using the first RL model during the online training, or an average reward value among the number of past trajectories generated using the first RL model during the online training.

* * * * *